US008831679B2

(12) United States Patent
Bajj et al.

(10) Patent No.: US 8,831,679 B2
(45) Date of Patent: *Sep. 9, 2014

(54) COMMON RADIO ELEMENT APPLICATION MANAGER ARCHITECTURE FOR WIRELESS PICOCELLS

(71) Applicant: Public Wireless, Inc., San Jose, CA (US)

(72) Inventors: Nart Bajj, Vancouver (CA); Robert Michael Reagan, Morgan Hill, CA (US)

(73) Assignee: Public Wireless, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,831

(22) Filed: Aug. 2, 2013

(65) Prior Publication Data

US 2013/0316692 A1 Nov. 28, 2013

Related U.S. Application Data

(62) Division of application No. 13/444,704, filed on Apr. 11, 2012, now Pat. No. 8,521,223.

(60) Provisional application No. 61/474,708, filed on Apr. 12, 2011, provisional application No. 61/568,295, filed on Dec. 8, 2011.

(51) Int. Cl.
| | | |
|---|---|---|
| H04M 1/00 | (2006.01) | |
| H04B 1/38 | (2006.01) | |
| H04W 84/04 | (2009.01) | |
| H04W 88/08 | (2009.01) | |
| H04W 92/20 | (2009.01) | |
| H04W 36/22 | (2009.01) | |

(52) U.S. Cl.
CPC ............ *H04W 88/08* (2013.01); *H04W 84/045* (2013.01); *H04W 92/20* (2013.01); *H04W 36/22* (2013.01)
USPC ....................................... 455/553.1; 455/561

(58) Field of Classification Search
USPC ........ 455/550.1, 552.1, 553.1, 561, 103, 436, 455/440, 453; 370/328, 331
See application file for complete search history.

(56) References Cited

U.S. PATENT DOCUMENTS

| | | | | |
|---|---|---|---|---|
| 7,957,705 | B1 * | 6/2011 | Oh ................................ | 455/104 |
| 8,521,223 | B2 * | 8/2013 | Bajj et al. .................... | 455/553.1 |
| 2002/0024993 | A1 | 2/2002 | Subramanian et al. | |

(Continued)

FOREIGN PATENT DOCUMENTS

KR 10-2010-0106852 A 10/2010

OTHER PUBLICATIONS

The International Search Report and Written Opinion of the International Searching Authority for related PCT Application No. PCT/US2012/033139, mailed Oct. 23, 2012, in 10 pages.

*Primary Examiner* — Nguyen Vo
(74) *Attorney, Agent, or Firm* — Procopio, Cory, Hargreaves & Savitch LLP

(57) ABSTRACT

A multi-modal multi-modulation base station such as a picocell is disclosed. The base station can include multiple radio devices that can be configured to communicate with user devices using different protocols and different frequencies. The base station includes a backhaul interface to core networks that can also operate according to multiple protocols. A common radio element application manager control operations of the radio devices including core network connectivity, mode-to-mode communications, and synchronization of picocell features.

15 Claims, 8 Drawing Sheets

(56) References Cited

U.S. PATENT DOCUMENTS

| | | |
|---|---|---|
| 2002/0064142 A1 | 5/2002 | Antonio et al. |
| 2008/0268778 A1* | 10/2008 | De La Garrigue et al. .. 455/41.2 |
| 2008/0268861 A1* | 10/2008 | Buracchini et al. ........ 455/452.1 |
| 2009/0005121 A1* | 1/2009 | Wong et al. ................. 455/562.1 |
| 2010/0216472 A1* | 8/2010 | Youn et al. .................... 455/436 |
| 2012/0064908 A1* | 3/2012 | Fox et al. .................... 455/452.2 |
| 2012/0214477 A1* | 8/2012 | Wieslawa .................. 455/422.1 |
| 2012/0295658 A1* | 11/2012 | Karaoguz .................. 455/552.1 |

\* cited by examiner

COMMON RADIO ELEMENT APPLICATION MANAGER ARCHITECTURE FOR WIRELESS PICOCELLS

CROSS-REFERENCE TO RELATED APPLICATIONS

This application is a divisional application of application Ser. No. 13/444,704, filed Apr. 11, 2012 which claims the benefit of U.S. provisional application No. 61/474,705, filed Apr. 12, 2011, and U.S. provisional application No. 61/568,295, filed Dec. 8, 2011, all of which are hereby incorporated by reference.

BACKGROUND

The present invention generally relates to the field of wireless communication systems and to systems and methods for managing wireless picocells.

Growth in wireless communication continues to increase. Demand for data services with high data bandwidth requirements has led to the introduction of multiple modulation techniques for wireless communication, such as Long Term Evolution (LTE), High-Speed Downlink Packet Access+(HSDPA+), and CDMA2000 1xEV-DO (Evolution-Data Optimized or "EVDO").

Additionally, deployment of small cells including picocells and femtocells has become increasingly desirable for providing coverage. Small cells may be deployed, for example, in areas having high user density, such as airports or event venues. A small cell deployment typically has a 100 meter to 1 kilometer radius. Both voice and data modes are desired in small cell deployments. Development of multi-modal multi-modulation capable picocells is complex. Such picocell systems need management of backhaul and core network connectivity as well as mode-to-mode communications and synchronization of picocell features.

SUMMARY

In one aspect, the invention provides a base station including a plurality of radio devices operable to establish wireless communications with user equipments; a backhaul interface module configured to send data to a core network and receive data from the core network; a radio frequency interface module coupled to the plurality of radio devices and to one or more antennas, the radio frequency interface module being configured to process signals from the plurality of radio devices for radio transmission by the antennas and to process signals received from the antennas and supply the processed received signals to the plurality of radio devices; and a common radio element application manager (CREAM) module configured to manage communications between the user equipments and the core network via the radio devices and the backhaul interface and to configure resources of the radio devices.

In another aspect, the invention provides a base station including a plurality of radio devices, each of the radio devices operable to establish wireless communications with user equipments; a backhaul interface module configured to send data to a core network and receive data from the core network; a radio frequency interface module coupled to the plurality of radio devices and to one or more antennas, the radio frequency interface module being configured to process signals from the plurality of radio devices for radio transmission by the antennas and to process signals received from the antennas and supply the processed received signals to the plurality of radio devices; a processor; and a memory coupled to the processor and storing instructions for execution by the processor, the instructions including a core network manager module operable to manage communications with the core network via the backhaul interface module; and a radio resource manager module operable to perform handover and call admission decisions for communications with the user equipments.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The systems and methods disclosed herein can be used with multi-modal multi-modulation picocells. Multi-modal multi-modulation picocells can be configured to provide wireless network connectivity to a plurality of user devices. The user devices can be associated with multiple voice/data network providers that use different frequencies and/or modulation schemes. Multi-modal multi-modulation picocells may include a system manager for backhaul and core network connectivity and for mode-to-mode communications and synchronization of picocell features. The systems and methods disclosed herein may be used to implement such a system manager.

Figure 1:
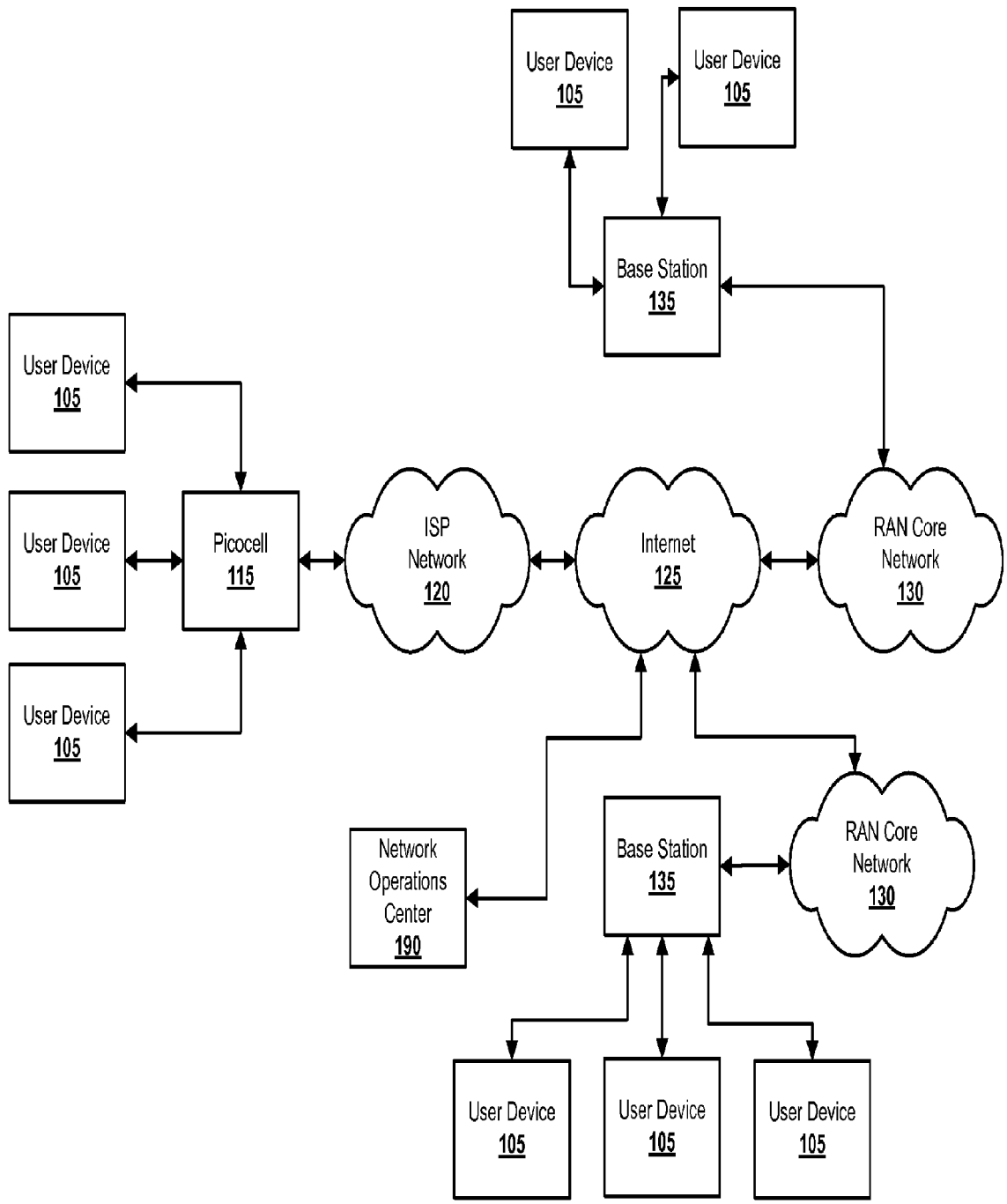
FIG. 1 is a diagram of a picocell deployed in a wireless communications network in accordance with aspects of the invention.

FIG. 1 is a block diagram of a wireless communications network. The wireless communications network includes a picocell 115. The picocell 115 is a small base station and may be deployed to provide coverage for a smaller area than a traditional, or macro, base station. The picocell may also be termed a femtocell or small cell. For example, the picocell 115 may provide coverage for an office building, hotel, condominium complex, shopping mall, airports, train station, or event venue. Picocells may be used to fill in coverage in indoor environments where signals from outdoor macro base stations do not easily reach. Picocells may also be used to add network capacity in areas where dense mobile device usage can be present, such as airports, train stations, and sports or concert venues.

The picocell 115 may be configured to provide coverage for one or more mobile phone carriers or network providers.

The picocell 115 communicates with a radio access network (RAN) core network 130 via a broadband connection provided by an Internet service provider (ISP) network 120. The ISP network 120 provides a backhaul connection for the picocell 115. The ISP network 120 may communicate with the RAN core network 130 directly or indirectly via the Internet 125. The RAN core network 130 provides telecom services to user devices 105. Each of the user devices 105 is subscribed to a respective network provider associated with the RAN core network 130. Some of the user devices 105 may be mobile communication devices, such as mobile phones, wireless modems, or other device that use voice, data, or other communications services of the RAN core network 130. Other user devices 105 may be fixed location devices.

The picocell 115 receives data from the RAN core network 130 via the ISP network 120 and transmits the data to one or more the user devices 105. The picocell 115 also receives data from the user devices 105 and transmits the data to the RAN core network 130 via the ISP network 120.

The picocell 115 can include one or more radio devices that can be remotely configured by a network administrator. The radio devices may be configured to operate using various frequencies (or bands) and communication protocols (or modulation techniques). The radio devices of the picocell may be reconfigured based on demand. Furthermore, the picocell can include extra radio devices beyond what is forecast for current coverage needs. The extra radio devices allow the picocell's capabilities to expand to provide service to a larger number of subscribers and/or carriers. The extra radio devices may also be used as backups that are activated if monitoring systems implemented for the picocell detect that a radio device has failed. Providing reconfigurable radio devices and extra radio devices can provide cost savings by reducing the need for a technician to be deployed into the field to service the picocell.

As described above, the picocell 115 may be operating according to contracts with one or more mobile network providers to provide coverage for a first group of user devices 105 that are associated with those network providers. User devices in a second group of user devices associated with other network providers may enter the coverage area of the picocell 115. The second group of user devices may be configured to communicate using different frequencies and/or communication modes than the picocell 115 is configured to use when communicating with the first group of user devices. Accordingly, it is advantageous for the picocell 115 to be able to operate using multiple modes and multiple frequencies.

The wireless communications network also includes base stations 135. The base stations 135 communicate with the RAN core network 130 and also provide coverage to the user devices 105. The picocell 115 may provide coverage in an area that overlaps with coverage areas of the base stations 135. FIG. 1 has been simplified for ease of explanation and a wireless communications network may additional elements including a plurality of picocells.

The wireless communications network also includes a network operations center (NOC) 190. The NOC 190 is used for managing operation of the picocell 115. A system administrator can remotely configure the picocell 115 in the event that a problem is identified that can be corrected by reconfiguring the picocell 115. The system administrator can also schedule a service technician to visit the picocell 115 in the field. In some embodiments, the NOC 190 manages operation of a network of different types of base stations installed across a wide geographical area. According to an embodiment, system administrators can monitor the network or networks providing backhaul connectivity to the picocell 115 and troubleshoot network problems. In the event that a problem occurs in a portion of the network managed from the NOC 190, a technician can be dispatched to correct the problem. In the event that a problem is detected in a portion of the network managed by a third party network provider, such as the ISP network 120, the system administrators can alert the third party network provider of the problem.

The picocell 115, in an embodiment, can collect and process various data received from the user devices 105. For example, the picocell 115 can be configured to enable intra-band and intra-protocol transmission of data to and from the user devices 105. Processing data to on the picocell 115 can allow the processing work to be handed off to the picocell which may have more resources for processing data than one of the user devices. The data may include sensor signal data, audio data, video data, voice data, and other data. The data collected from the user devices 105 can be processed by the picocell 115. The data received from one of the user devices 105 can be processed according to the requirements of a specific application. The processing can include identifying which data is relevant and of specific interest for utilization within the specific application. Accordingly, certain of the data can be collected in a local storage medium or discarded as appropriate. The results of the processing of the data can be returned to the user device. The data, before or after processing, may be pushed to other locations in the picocell network or the Internet. Distributed data processing, whereby data can be processed by the picocells at the edge of the network without requiring the data to be sent to the core network for processing, may be used.

The picocell 115, in an embodiment, can cache information. The information may be used to identify a particular user or user device. The cached information can be used in various ways, for example, in security systems and for marketing with other network operators. The picocell can confirm the local presence of a UE using various means. For example, the base station can confirm the presence of the UE using the over-the-air interface. In some embodiments, the picocell 115 can also use a secondary means to identify the presence of the UE at a particular location. For example, the secondary means could include GPS coordinates obtained from a GPS unit associated with the UE or triangulation of the location of the UE using a signal transmitted from the UE. The picocell can be configured to log the secondary location related information during UE interactions with the picocell. In an embodiment, a device can also capture imagery that can be used to tie the UE to a specific location. Additionally, the picocell 115 may use information from a vector network analyzer in determining a specific physical location of a UE.

Figure 2:
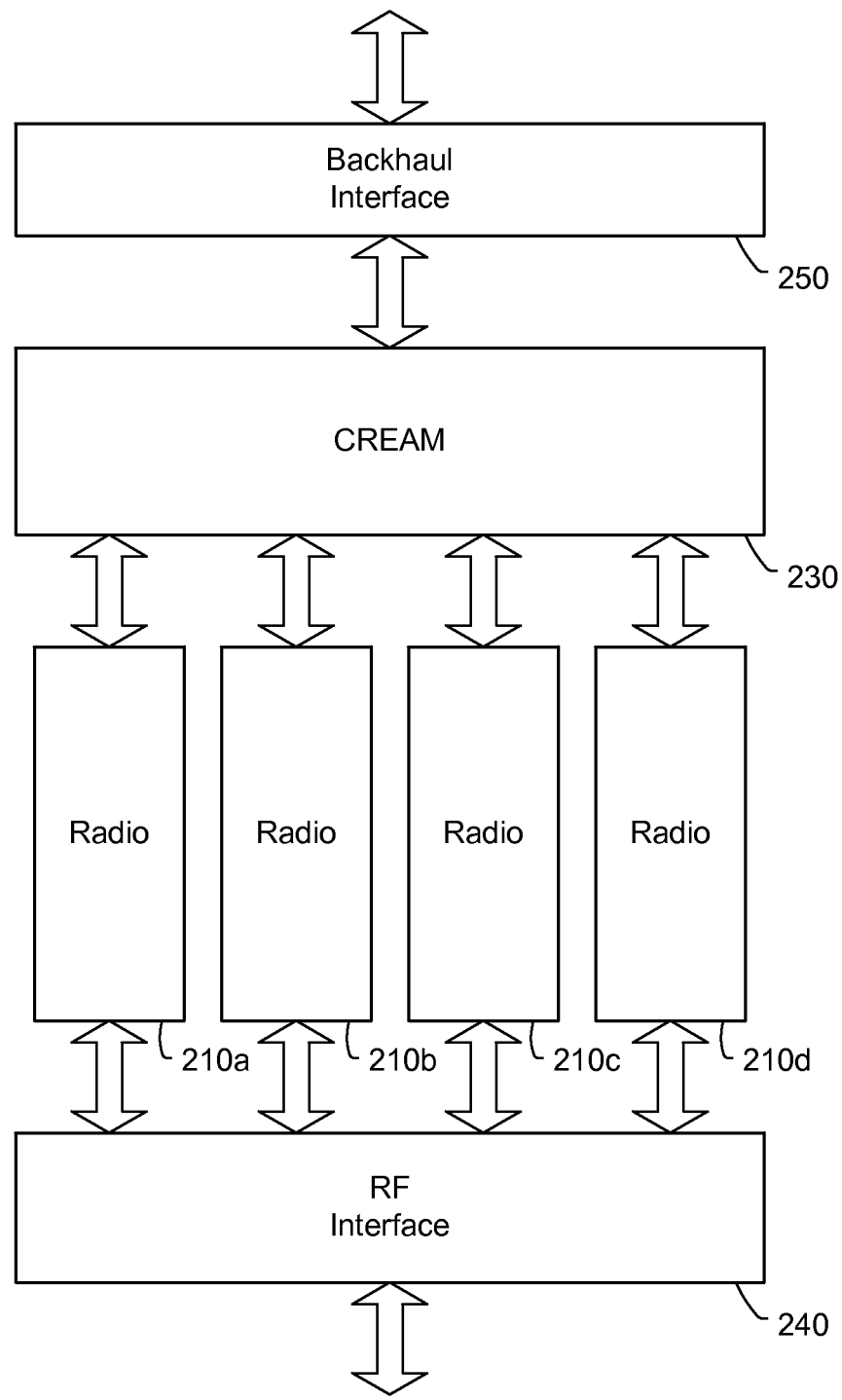
FIG. 2 is a functional block diagram of a picocell in accordance with aspects of the invention.

FIG. 2 is a functional block diagram of a picocell according to an embodiment. The picocell may be used to implement the picocell 115 of FIG. 1. The picocell of FIG. 2 includes a radio frequency (RF) interface module 240, a backhaul interface module 250, and a common radio element application manager (CREAM) module 230. The picocell illustrated in FIG. 2 includes four radio devices 210. However, in other embodiments, the picocell may include greater or fewer radio devices. For example, a picocell deployed in an area that is anticipated to have a high concentration of user devices during peak usage may include more radio devices than a picocell deployed in an area that is anticipated to have a low concentration of user devices. The CREAM module 230 provides an interface that allows a picocell to include multiple radio devices 210 and to manage the interaction of the radios.

The RF interface module 240 provides an interface for radio signals to and from the picocell. The RF interface module 240 couples the radio devices 210 to one or more antennas. The antennas can include a broadband antenna used for transmitting and receiving in the frequency bands that are used for mobile communications. The RF interface module 240 includes circuitry for transmission and reception of the radio signals such as power amplifiers for driving the antennas, low noise amplifiers (LNAs) for amplifying signals received by the antennas, tuners, upconverters, and downconverters.

The RF interface module 240, in some embodiments, combines and splits the radio signals. For example, the picocell may be configured for MIMO or diversity operation. Additionally, the RF interface module 240 may operate in multiple frequency bands. The RF interface module 240 may include modules that are dynamically configurable or adjustable. For example, a power amplifier in the RF interface module 240 may be configured for various predistortion techniques and may have an adjustable bias setting. The bias setting may be chosen to provide an interband and interprotocol optimized setting. In an embodiment, the RF interface module 240 employs digital predistortion (DPD) and crest-factor reduction (CFR) techniques. The combination of DPD and CFR schemes in conjunction with power amplifier bias control can provide high performance, reduce costs, and reduce power requirements.

Each of the radio devices 210 may be configured to support a specific protocol stack. The protocol stack may include, for example, a Radio Resource Control (RRC) layer, a Packet Data Convergence Protocol (PDCP) layer, a Radio Link Control (RLC) layer, a Media Access Control (MAC) layer, and a Physical (PHY) layer. The protocol layers of the radio devices 210 may differ and allocation of functions over the layers may also differ.

The Radio Resource Control (RRC) layer handles the control plane signaling of Layer 3 between the user devices and the Universal Terrestrial Radio Access Network (UTRAN). The UTRAN allows connectivity between the UE and the core network. The UTRAN includes base stations (eNodeBs) and Radio Network Controllers (RNCs). The RRC layer provided functions for connection establishment and release, the broadcast of system information, radio bearer establishment/ reconfiguration and release, paging notification and release, and outer loop power control.

The Packet Data Convergence Protocol (PDCP) layer performs IP header compression and decompression, transfer of user data and maintenance of sequence numbers for Radio Bearer.

The Radio Link Control (RLC) layer delivers data to the MAC layer over logical channels. The RLC layer maps these logical channels to transport channels that represent the interface to the physical layer. The RLC layer can provide error correction and can also ensure that data is delivered only one time and in the correct sequence. The RLC layer can also segment data packets delivered by higher layers so that the MAC sublayer receives data of the correct size over the logical channels.

The Media Access Control (MAC) layer coordinates access to the physical medium over which data is transmitted. The MAC layer can include queue in which data for different data streams can be placed until the data is transmitted.

The Physical (PHY) layer provisions transport channels, maps transport channels to the physical interface, provides macro diversity and soft handover. The physical layer can also provide error protection, such as forward error correction and interleaving. The physical layer can also provide for multiplexing and demultiplexing, frequency and time synchronization, power control, and measurements of various characteristics of the physical link, such as frame error rate.

Each of the radio devices 210, in some embodiments, is configured to implement one protocol stack. For example, in the embodiment illustrated in FIG. 2, the first radio devices 210a may be configured to implement a UMTS protocol stack, the second radio devices 210b may be configured to implement a CDMA1X protocol stack, the third radio devices 210c may be configured to implement a EVDO protocol stack, and the fourth radio devices 210d may be configured to implement a LTE protocol stack. In other embodiments, the radio devices 210 may be configured to support a different combination of wireless communication protocols. Additionally, in some embodiments, the radio devices 210 can be reconfigured dynamically based on the types of user devices being served by the picocell.

The radio devices 210 may be provided as software-defined radios (SDRs). An SDR is a programmable radio device that includes a processor for executing signal processing. A variety of different radio protocols (waveforms) can be received and transmitted depending on the software that is executed by the processor of an SDR. An SDR can be rapidly reconfigured to change radio protocols used. In an embodiment, processing circuitry may be shared between radio devices and between radio devices and other modules of the picocell.

The CREAM module 230 manages radio resources of the picocell. The CREAM module 230 provides an interface that allows the picocell to include a plurality of the radio devices 210. Particular embodiments of the CREAM module 230 are described in later sections of the application. By way of introduction, the CREAM module 230 may provide functions such as: managing the connectivity of multiple protocol stacks with each other; allocating radio resource elements within a scheduler in each of the radio devices; managing connectivity between cells in the same picocell and between different picocells; performing radio transfers between radio devices within the picocell; facilitating handoffs between networks; managing connectivity between radio devices of the picocell and core networks; scheduling and managing each of the protocol stacks; handling user equipment mobility across multiple protocols within a picocell; dynamically configuring the radio devices; coordinating resource allocation between picocells; and managing operation, administration, and maintenance (OAM) functions.

The backhaul interface module 250 provides an interface to backhaul communications for the picocell. The backhaul connections may vary, for example, depending on the type of network that the picocell will be connected to. For example, the backhaul interface module 250 may include a Data Over Cable Service Interface Specification (DOCSIS) connection, an Asymmetric Digital Subscriber Line (ADSL) connection, a Very-high-bit-rate Digital Subscribe Line (VDSL) connection, a satellite connection, or an optical fiber connection. In some embodiments, the backhaul interface module 250 includes connections for multiple backhaul interfaces. Data received from the network is supplied to the other modules of the picocell via the backhaul interface module 250. Similarly, data from the modules of the picocell is transmitted to the network via the backhaul interface module 250. The backhaul interface module 250 may also provide power distribution and control, environmental monitoring, and local and remote system management support for the picocell.

According to an embodiment, the backhaul interface module 250 can include or be considered an external radio device support system (ERDSS) module that operates with various types of backhaul connections. Interactions between the NOC 190 and the picocell can occur via the ERDSS module. For example, a system administrator can remotely monitor operating status of the picocell, send configuration commands and/or updated software to the ERDSS module to remotely modify the operation of the picocell.

Figure 3:
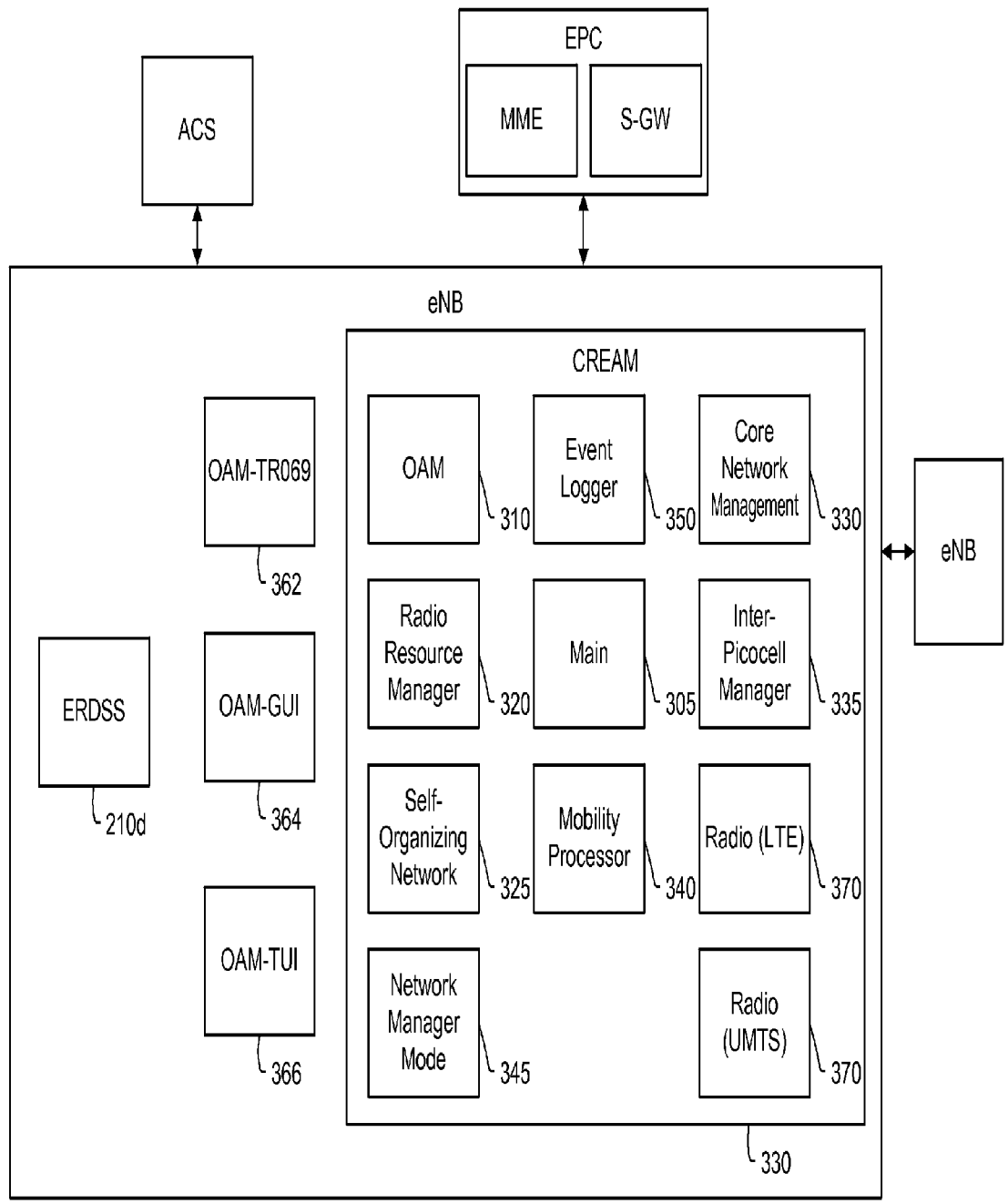
FIGS. 3 and 4 are a functional block diagrams illustrating various aspects of a common radio element application manager in accordance with aspects of the invention.
Figure 4:
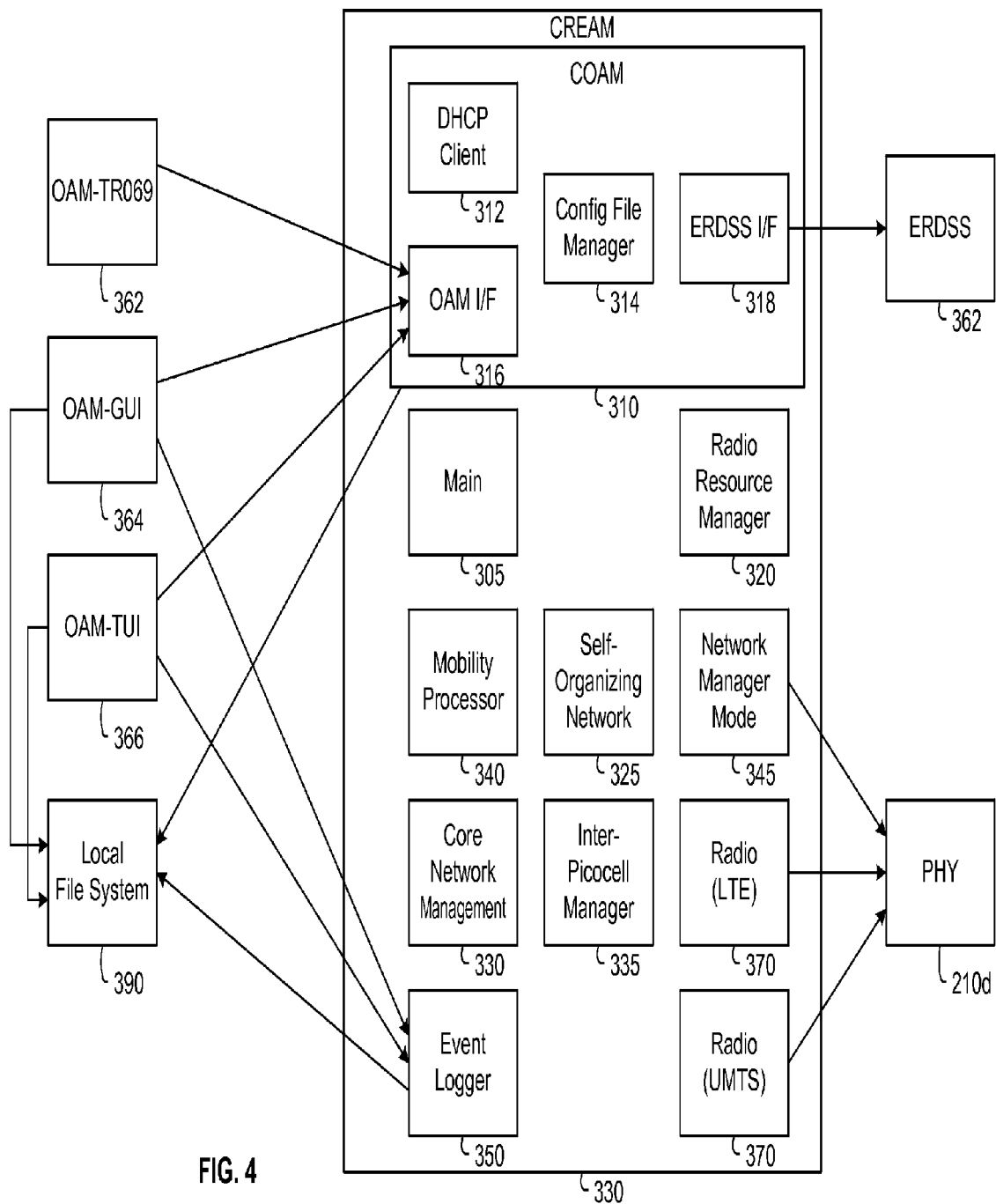

FIGS. 3 and 4 are functional block diagrams of a CREAM module in accordance with aspects of the invention. The CREAM module of FIGS. 3 and 4 may be used in an embodiment of the picocell of FIG. 2. The CREAM module provides support for automatic configuration of access network parameters, real-time adjustment and optimization of access network and radio parameters, and flexibility to operate on multiple cells using differing radio access technologies. The CREAM module manages the resources of the associated picocell (or eNB) and its connections. It provides operational control of multiple attached radios (cells) while implementing inter-RAT and intra-RAT handovers, system optimization, and load balancing using SON algorithms. For convenience of presentation, portions of the CREAM module are described using only software terminology but it should be understood that the functions of the CREAM module may also be implemented in hardware or a combination of hardware and software.

The CREAM module, by way of introduction, includes functions providing resource management, operational control, and management of call processing. Example functions for resource management include initializing and configuring the eNB; monitoring resources and performing health and status reporting and fault processing; maintaining a collection of available EPC nodes (MME and S-GW) and status information on those nodes; maintaining a collection of other eNBs in the network, their managed cells, and status information; establishing and monitoring S1 connections; establishing and monitoring X2 connections; managing multiple baseband PHY elements and radio access protocol stacks; and allocating radio resource elements within each protocol scheduler.

Example functions for operational control include managing all configuration items which may be set by an automatic configuration system (ACS) (via TR-069 interface); providing OAM functions using a direct user interfaces, a web based GUI, and a text based maintenance terminal; synchronizing an active running configuration with a configuration stored in non-volatile memory; providing operator control of resource usage; and providing access to error, activity, and alarm logs.

Example functions for management of call processing include managing UE mobility across multiple cells within the same access network; managing UE mobility across multiple cells across different access networks; controlling admission and load-balancing with neighboring cells; load-balancing of core network node usage; and resolving and reporting cell identity conflict for enforcing all neighbors to a cell to have unique PCI.

The CREAM module includes a main module 305. The main module 305 provides a beginning function for the other modules. The main module 305 contains the entry point for the CREAM process. The main module 305 performs allocation of buffer pools for use by CREAM modules. For example, the main module 305 may initially allocate all or most of the memory used by the CREAM process to avoid dynamic allocations and deallocations of memory. The main module 305 also performs creation and initialization of CREAM components. For example, a COAM module, an Event Logger module, and an RRM module may be directly instantiated by the main module 305. The main module 305 also manages release of CREAM components for shutdown of the CREAM process. The main module 305 also provides processing of a main event loop, in some embodiments. The main module 305 may use a watchdog timer. In some embodiments, the main module 305 spawns separate threads for other modules. The main module 305 also drives system initialization procedures.

The CREAM module includes a CREAM OAM (COAM) module 310. The COAM module 310 manages configuration and monitoring requests between CREAM process components and external systems. For example, the COAM module 310 may manage request for the CPE WAN Management Protocol (OAM-TR069), graphical user interface (OAM-GUI), and terminal user interface (OAM-TUI). Accordingly, the COAM module 310 communicates with COAM clients, such as an OAM-TR069 module 362, an OAM-GUI module 364, and OAM-GUI, and an OAM-TUI module 366.

The COAM module 310 control configurations of other CREAM modules, for example, by routing configuration updates, by loading stored configurations from a file system, and by applying settings to a running configuration. The COAM module 310 synchronizes the stored configuration with changes to the running configuration. The COAM module 310 may also replace the stored configuration with a factory (default) configuration. The COAM module 310 may perform integrity checks on stored configuration and alarm history files. Unknown or invalid data model elements found in an integrity check are generally logged and subsequently ignored.

The COAM module 310 may also perform integrity checks on requests it receives from the COAM clients. Unknown or invalid data model elements are generally logged and then ignored.

The COAM module 310 may also maintain states of various system alarms. Changes in the states of the system alarms are recorded in the alarm history file. Accordingly, the COAM module 310 manages an alarm history file system, for example, by providing file rotation and deletion of old files. Additionally, the COAM module 310 may inform the COAM clients of alarm state changes and configuration changes.

The COAM module 310 may also gather statistics from CREAM component modules as requested by the COAM clients. The statistics may include instantaneous statistics and statistics gathered over time windows. The COAM module 310 routes logging and message tracing control commands received from the COAM clients to the other CREAM modules.

Additionally, the COAM module 310, in some embodiments, manages CREAM system operational state changes, runs system self-tests, and implements DHCP client operations.

The CREAM module includes a radio resource manager (RRM) module 320. The RRM module 320 provides control for handover and call admission decision making. Inputs from other modules, such as a self-organizing network (SON) module, an inter-picocell manager (IPM) module, core network management (CNM) module, and terminal measurements are used for decisions on handover and call admission. The RRM module 320 interfaces with the radio protocol interface layer (for example, using an LTE library 370) to communicate with associated cells and ultimately UEs. The RRM module 320 can allocate control and data downlink and uplink channels through schedulers in the MAC layers of the radio devices 210.

Operations performed by the RRM module 320 include maintaining a list of owned cells and for each owned cell, maintaining black lists and white lists of neighbor cells. Similarly, the RRM module 320 provides automatic neighbor list operations, for example, using reported UE measurements. The RRM module 320 also performs admission control for incoming handovers and connection setups. Handover decisions, for example, trigged by load balancing, by mobility, or by system shutdown, are also performed by the RRM module 320. The RRM module 320 can also manage connectivity of the protocol stacks of the radio devices 210 with each other.

The CREAM module includes the self-organizing network (SON) module 325. The SON module 325 provides functions for monitoring system operation and adjusting parameters to effect auto-configuration, self-healing, and optimization requirements. Operations performed by the SON module 325 include RACH optimization procedures, tracking area update procedures, mobility performance adjustments (for example, updates to the RRM modules handover decision parameters to adjust for early, late, and wrong cell handover failures), and PCI selection.

The SON module 325 can also be used to setup cell radius conditions based on a specific QoS profile per user and per picocell. The SON module 325 can also be used to manage load balancing within the picocell itself. The SON module 325 provides initial setup and configuration and dynamic control.

In an embodiment, the SON module 325 can use demand-based/usage-based self learning algorithms and predictive algorithms to dynamically reconfigure the radio devices 210. The predictive algorithms can anticipate usage conditions so that the picocell can be configured to meet the anticipated usage. The prediction algorithms can make predictions including information event information from a third-party source, historical data collected by the picocell, or data from other base stations in a coverage area.

The SON module 325 can reconfigure the radio devices of the picocell to use different wireless protocols based on capacity resource allocations. For example, a wireless network provider can contract with the picocell provider to provide a specific base capacity for the wireless network provider's subscribers. The wireless network provider can also contact with the picocell provider to provide additional capacity, if available, in peak usage situations where the wireless network provider's subscribers have utilized the base capacity.

The SON module 325 can also coordinate resource allocation between picocells. For example, in some embodiments, the SON module 325 can send signal information to adjacent picocells. By sharing utilization information among picocells, the SON module 325 can better anticipate the demands on the picocell and to reconfigure to picocell accordingly.

The CREAM module includes a core network manager (CNM) module 330. A primary function of the CNM module 330 is to contain and track status on the collection of registered core network nodes (MME/SGWs for LTE). For LTE support, the CNM module 330 interfaces with the LTE library 370 to operate an S1-MME link. In some embodiments, most terminal-related 51 interactions are handled internal to LTE library 370, thus the functions provided by the CNM module 330 are limited. The CNM module 330 may be more involved in the interaction with core network nodes in other embodiments. Additionally, in some embodiments, functions of the CNM module 330 vary between the particular protocols provided.

The CREAM module includes an inter-picocell manager (IPM) module 335. The IPM module 335 contains and tracks statuses on a collection of peer eNB nodes. For LTE, for example, the IPM module 335 uses the LTE library 370 for maintaining connectivity with the eNB peers. The IPM module 335, in some embodiments, operates a custom interface (X2') to provide features not supported by the X2 standard for connections established with other CREAM-enabled picocells. At initialization, the IPM module 335 broadcasts its presence over the X2' interface to locate other CREAM-enabled picocells and establish communications with them.

In an embodiment, the IPM module 335 performs intra-radio transfers between radio devices within the picocell, that is, the transfer of a UE from one radio device to another radio device. The intra-radio transfers can be between radio devices that are operating using the same frequency and modulation, that are operating using the same frequency but different modulation, that are operating using the same modulation but different frequencies, or that are operating using different frequencies and different modulation. For example, the IPM module 335 may facilitate handoffs between a 3G and a 4G network.

When network coverage configuration changes (e.g., cell activation, deactivation, or neighbor addition and removal) are communicated to the IPM module 335, the IPM module 335 starts a short timer to allow multiple changes to be collected. When the timer expires, the IPM module 335 announces all changes received during the timer window on X2 as one message when possible. For example, when multiple cells on the eNB are activated at approximately the same time, only one X2 message is generated on each X2 connection instead of one X2 message per cell activation being generated on each X2 connection.

The CREAM module includes a network monitor mode (NMM) module 345. The NMM module 345 provides an interface to the physical layer. In an embodiment, this is a message-based interface implemented over the PCI bus. The interface may be used to provide cell signal measurements from the attached radios to the SON module 325 for interference and signal quality managements. For example, the NMM module 345 may implement the Femto Application Platform Interface, PHY mode control interface (FAPI P4).

The CREAM module includes a mobility processor (MP) module 340. The MP module 340 oversees actions required to carry out handover operations. The module 340 also maintains information used to support PCI conflict detection. Operations provided by the MP module 340 include managing a state machine for handover processes and determining if the handover uses X2, S1, or Inter-RAT operations. The MP module 340 may also build and maintain graphs of known cells and their neighbor relationships and maintain information regarding ownership for all known cells. The cell graph is constructed using information received from the RRM module 320 (for owned cells and cells detected from UE measurements) and from eNB configuration announcements received via IPM from the X2 interface.

The MP module 340 can be configured to handle user equipment mobility across multiple UMTS and LTE EnodeBs within a picocell as well as managing the Iur and X2 interfaces between picocells and the core networks. Hence, multiple users could be balanced over several protocols depending, for example, on throughput QoS profiles, radio conditions, and backhaul capacity for each operator.

The CREAM module includes an event logger (EL) module 350. The EL module 350 receives information from other modules. The EL module 350 may alternatively or additionally poll modules for information. Event information may be saved in a local file system 390. The local file system 390 may also be used to store a CREAM software image, stored and factory configuration files, log files, and alarm history files.

The OAM client modules that interface with the CREAM module via the COAM interface module 310 include an OAM-TR069 client module 362. The OAM-TR069 client module 362 implements a TR-069 interface to an automatic configuration system (ACS). TR-069 defines the CPE WAN management protocol (CWMP) protocol for remote management of end-user devices. The OAM-TR069 client module 362 includes an embedded web server or makes use of a web server in another module (for example, the OAM-GUI module 364). When the OAM-TR069 client module 362 and the OAM-GUI module 364 include web servers, the servers may be configured to use different HTTP and HTTPS ports. In an embodiment, the COAM interface module 310 also implements the TR-111 protocol. TR-111 provides mechanisms for applying TR-069 to remote management of home networking devices.

Operations provided by the OAM-TR069 client module 362 include conducting TR-069 session with an ACS, building a vendor configuration file and downloading it to the ACS, and uploading a vendor configuration file from ACS, decoding it, and setting corresponding configuration values using the COAM interface module 310. The OAM-TR069 client module 362 may also upload a software image file to the eNB, store the image file in an appropriate location, and initiate a software update process. Based on operator requests, the OAM-TR069 client module 362 sends parameter get and set commands to the COAM module 610. In some embodiments, a direct (not using COAM interface commands) reboot of the eNB may be performed via the OAM-TR069 client module 362.

The OAM client modules also include an OAM-GUI client module 364. The OAM-GUI client module 364 includes web server (for example, a stripped down build of Apache for Cavium Linux or a custom server component built around libwww or similar library) and a collection of web pages implementing the operator's user interface.

Operations provided by the OAM-GUI client module 364 include building a vendor configuration file and download it to a user-specified location and uploading vendor configuration file from a user-specified location to the eNB, decoding it, and corresponding configuration values using the COAM interface module 310. The OAM-GUI client module 364 may also upload a software image file to the eNB, store the image file in an appropriate location, and initiate a software update process. Displays provided by the OAM-GUI client module 364 include a snapshot of an event log, a snapshot of a syslog, an alarm history, and a current alarm status. Via the OAM-GUI client module 364, periodic polling and monitoring of user-specified readable configuration and status values and modification of writable configuration values are provided. In some embodiments, a direct reboot of the eNB may be performed via the OAM-GUI client module 364.

The OAM client modules also include an OAM-TUI client module 366. The module has a text-only shell and provides a set of command-line tools. The tools may be used to build a vendor configuration file, decode a vendor configuration file, and perform bulk and individual updating of configuration parameters. Additional example tools include commands to transfer of files onto and off of the CREAM file system, read and write partitions of non-volatile memory in the picocell, initiate software updates, view event, alarm, and system logs, view alarm status, and display configuration values and statistics. In some embodiments, a direct reboot of the eNB may be performed via the OAM-TUI client module 366.

The modules within the CREAM module, in an example embodiment, are executed as software or firmware on a programmable processor (including multiple processors and processors with multiple cores). Various combinations of the CREAM modules may execute concurrently. For example, a boot-loader may initiate an operating system supporting multiprocessing, such as SMP-Linux, to use multiple processing cores available cores the CREAM processor. Accordingly, some processes may runs as standard parts of the Linux operating environment.

In the example embodiment, system processes include a collection of user and kernel processes that runs as a standard part of the Linux operating environment. Example processes include init, kflushd, kupdate, kpiod, kswapd, syslogd, sshd, and getty. The init process is configured to start the CREAM process, the OAM-TR069 client process, and a web server of the OAM-GUI module as auto-respawn processes in runlevel 5 and as run-once processes in runlevel 4. The sshd process is executed as an auto-respawn process in all runlevels. Runlevel 5 is considered the default, normal operations runlevel. The boot loader controls which runlevel the system enters after kernel start-up (e.g., runlevel 4 or 5) by passing boot arguments to the kernel.

The CREAM module, in the example embodiment, executes as a multi-threaded task. The main module 305 starts a default event-loop thread under which other CREAM modules execute. The CREAM modules may create additional threads as needed according to various embodiments.

The COAM client modules, in the example embodiment, use a collection of processes to provide the functions identified for the TR-069-based OAM interface, the web-based OAM interface, and the text-based OAM interface. The three OAM interfaces communicate with the CREAM module via the COAM interface module 310. A process for the OAM-TR069 client module 362 generally is always running. Although the process may include multiple threads, the threads may be restricted so that at most one instance of this process is active at any given time. The process for the OAM-TR069 client module 362 includes an interface that acts as a TR-069 client for communicating with an ACS and another interface that acts as a COAM client. The process for the OAM-GUI client module 364 includes a web server and back-end web pages implementing a graphical user interface. The back-end web pages act as a COAM client to communicate with the CREAM module. The web server is always running and may use multiple threads or multiple server processes to handle web requests. The server is configured to accept HTTP and HTTPS connections on the standard ports for those protocols. The process for the OAM-TUI client module 366 includes a collection of command-line tools used by a maintenance operator or software/test engineer. The processes produced by OAM-TUI client module 366 depend on what commands have been issued by the user. The processes produced run only until the requested function completes or until the user disconnects from the terminal.

In a system with multiple processing cores, some processes may by configured to only run on a subset of the available cores. For example, in a processor with n cores label 0 to n−1, system processes and threads created by CREAM modules (except threads for the radio protocol) are configured to run using only cores 0 and 1, processes for COAM client modules are configured to run on core 0, and threads implementing L3/L2 radio protocols for each configured cell are assigned to a single core dedicated to processing for that cell. For example, the RRM module 320 may allocate processes for each configured cell to an available core from cores 2 through n−1.

The CREAM modules uses various data structures for implemented the associated functions. The data is organized in various for particular embodiments.

The CREAM module performs several system-level sequences for operation of the picocell to handle system-wide operations. Example sequences include resource management sequences, operational control sequences, and call processing sequences.

The resource management sequences provide activation and deletion of radio resources and addition and deletion of connections to network nodes. Example resource management sequences include sequences for OAM addition of a managed cell, removal of a managed cell, physical cell identifier selection, and physical cell identifier change.

The operational control sequences provide processing for internal picocell components during various OAM control operations. Example operational control sequences include sequences for CREAM start up, CREAM shut down, changing operational mode from offline-standby to online-normal, changing operational mode gracefully from online-normal to offline-standby, changing operational mode online-normal to offline-standby, restoring factory configuration, and updating software.

The call processing sequences provide processing for inter-module signaling involved in UE-related activity. Example call processing sequences include sequences for S1 handover, handover between managed cells (e.g., intra-eNB handover), automatic neighbor relations (e.g., adding a new neighbor), S1 eNB configuration lookup, and UE attachment.

As shown in the embodiment of FIG. 4, UNIX (Linux) domain sockets provides connections between the COAM module 310 and the OAM client modules (OAM-TR069 module 362, OAM-GUI module 364, and OAM-TUI module 366). The sockets pass messages for operational control of the CREAM module, modification of configurable parameters, and reception of notifications and readable values.

Also shown in FIG. 4, a TCP socket interface is served by the event logger (EL) module 350. This interface is an ASCII stream implemented. The EL module 350 acts as the server side of the interface, and interface control is provided through messages on the COAM interface. When new connections are accepted, the EL module 350 starts, in one embodiment, an RT-log connection timer (e.g., default: 2 seconds). The first 4 bytes received on the interface are interpreted as a logging context identifier in network byte order. If 4 bytes are not read when the RT-log connection timer expires, the event logger closes the socket. Once the context identifier has been read, the EL module 350 stops the RT-log connection timer and attempts to look up the identified logging context. If the received identifier does not match a valid context then the socket is closed. Multiple open sockets may match the same logging context. Once a socket has been associated with a logging context, log messages will be sent to the socket as line feed terminated ASCII strings (as they would appear in the corresponding log file).

Also shown in FIG. 4, the CREAM modules also include interfaces between the COAM module 310 and an ERDSS and between the NMM module 345 and associate radio hardware. This interface provides backhaul connectivity and system status monitoring and reporting. Interface between the COAM module 310 and the ERDSS is SOAP-based and implemented over a UDP socket. The ERDSS acts as the server side of the interface.

In addition to the above module and interface dependencies, the modules within the CREAM module may be cognizant of data dependencies. For example, a first one of the modules may rely on another module to allocate a data structure used by the first module.

Figure 5:
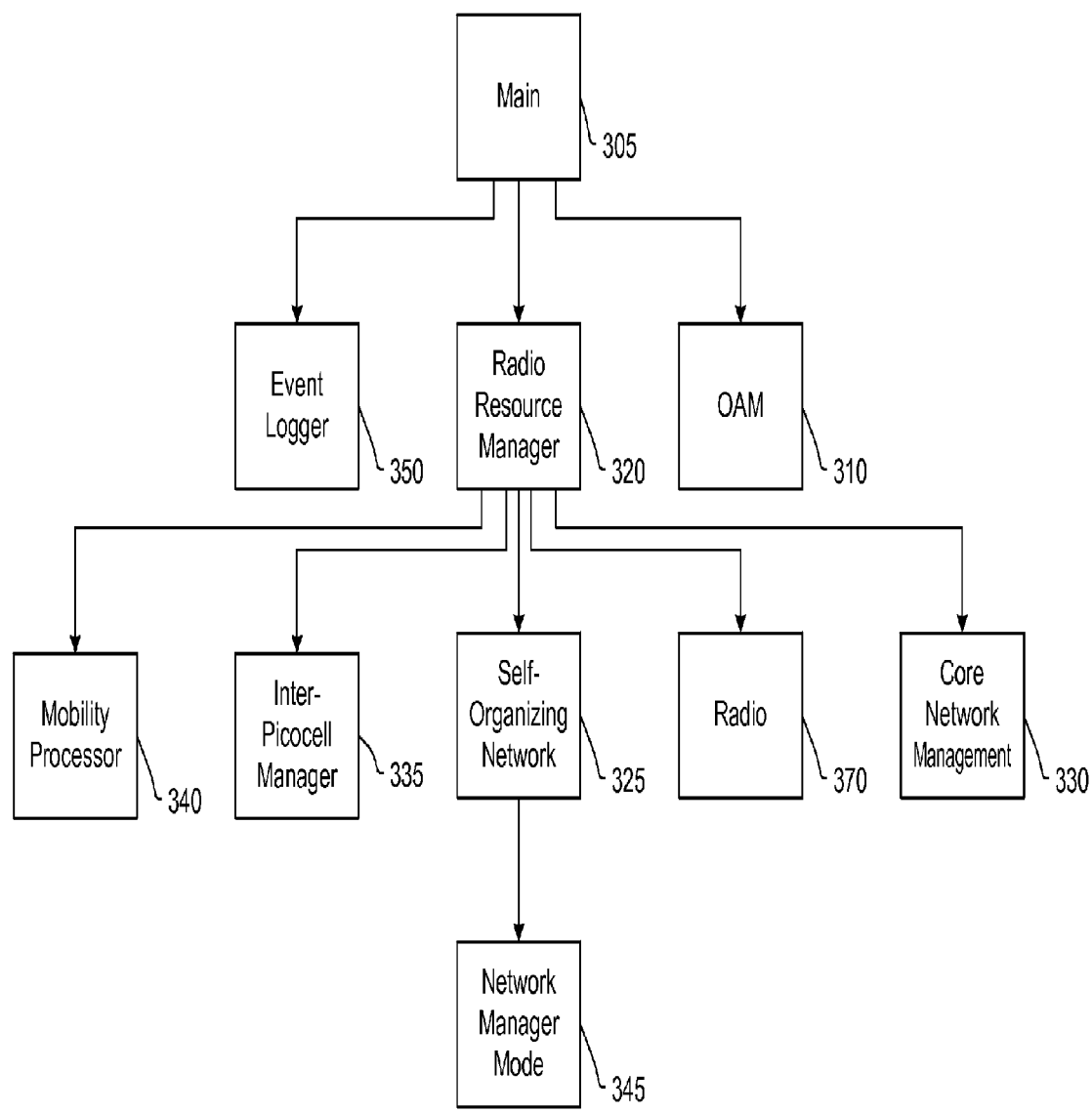
FIG. 5 is a diagram illustrating creation of the modules within a common radio element application manager in accordance with aspects of the invention.

FIG. 5 is a graph of creation of the modules within the CREAM module in accordance with aspects of the invention. In the embodiment of FIG. 5, at startup, the main module 305 instantiates the EL module 350, the RRM module 320, and COAM interface module 310. The RRM module 320 in turn instantiates the SON module 325, MP module 340, IPM module 335, CNM module 330, and radio protocol modules 370. The SON module 325 instantiates the NMM module 345. A module is considered to be the 'controller' module of any modules it directly instantiates. The controller modules are responsible for both the initialization and cleanup (shut down) of the modules they control. In other embodiments, which modules are controller modules and the modules they control may differ from the embodiment of FIG. 5.

Figure 6:
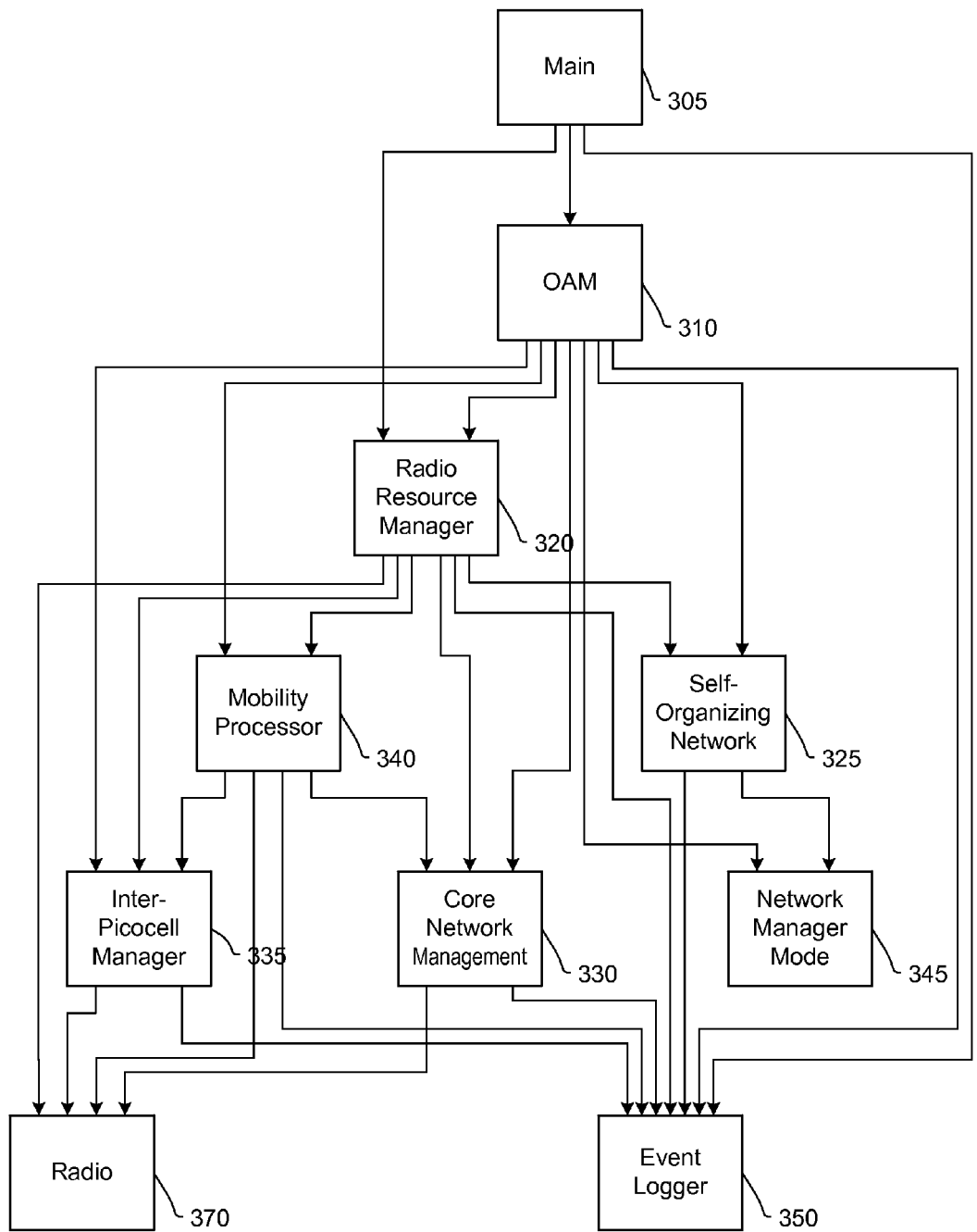
FIG. 6 is a diagram illustrating dependencies between modules within a common radio element application manager in accordance with aspects of the invention.

FIG. 6 shows a dependency tree for modules within the CREAM module. The dependency tree of FIG. 6 is similar to the creation graph of FIG. 5 but show additional dependencies between the modules after the instantiations show in FIG. 5. In other embodiments, the dependencies between modules may differ from the embodiment of FIG. 6.

The dependencies shown in FIG. 6 are for an implementation where the COAM clients (OAM-GUI, OAM-TR069, and OAM-TUI) and the CREAM module co-exist on a processor, and the ERDSS runs on a separate processor. The COAM clients expect the CREAM task to create the socket to which they connect to establish the COAM interface to the CREAM module. If the socket does not exist, the COAM clients and the CREAM module will retry periodically until able to establish a connection.

The module dependencies shown in FIG. 6 correspond to interfaces between the modules. In one embodiment, each of the modules that interacts directly with another module has a specific interface to use for that interaction and there are no shared interfaces. For example, the RRM module 320 interacts with the IPM module 335 and the MP module 340 interacts with the IPM module 335. Accordingly, there is one interface between the RRM and the IPM module 335 and another interface between the MP module 340 and the IPM module 335.

In the embodiment of FIG. 6, modules that are lower in the dependency hierarchy provide the interface for modules higher in the hierarchy. Accordingly, in one embodiment, a higher-level module directly calls methods of a lower module that are given external exposure and the lower module defines a set of callback methods in an 'observer' class to be implemented by the higher module.

All modules of the CREAM module exist, in an embodiment, as singleton instances. Accordingly, a create( ) method is exported as a static method allowing any objects needed by the module and its external interface or interfaces to be instantiated. Subsequent calls to create( ) after the first call perform no additional actions.

Each module, in the embodiment of FIG. 6, exposes an initialize( ) and shutdown( ) method on the interface to its controller module. The initialize( ) method commands the module to take whatever action is needed to enter a state of normal operation. The shutdown( ) method commands the module to perform any necessary cleanup in anticipation of module deletion and process exit. A module may be returned to an initial state, ready for normal operation, after shutdown( ) has been called by calling initialize( ). The initialize( ) method performs no actions if the module is already initialized. Likewise, the shutdown( ) method performs no actions if the module is already shut down. In a module that maintains associations to observer classes, calls to initialize( ) and shutdown( ) should not affect the associations so that registerObserver( ) need only be called once after create( ) and before the first initialize( ).

Figure 7:
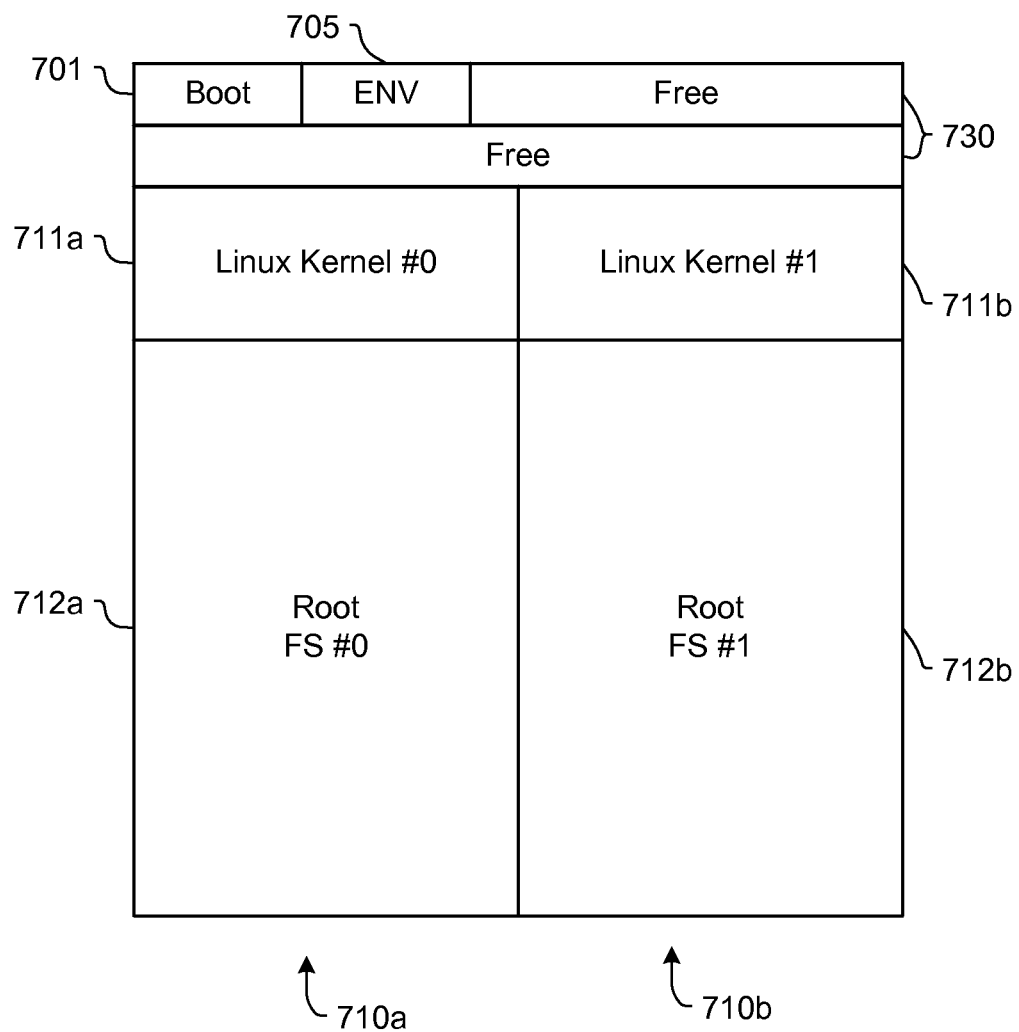
FIG. 7 is a diagram illustrating a memory partition for use by a common radio element application manager in accordance with aspects of the invention.

FIG. 7 is a diagram illustrating a memory partition for use by a common radio element application manager module. The illustrated memory partition may be used with the CREAM module of FIGS. 3 and 4. Additionally, the memory partition shown in FIG. 7 may be used for non-volatile storage, for example, flash memory, used with a processor providing operations for the CREAM module. The memory is partitioned into three main areas: a boot loader 701 and its stored environment variables 705; and two software image partitions 710. Each software image partition 710 is further partitioned into a region for storage of the Linux kernel image 711 and a region for the root file system 712.

The boot-loader 701 is configured to boot one of the software image partitions as the 'active' partition. The other partition is referred to as the 'standby' partition. In and embodiment, the information indicating which partition to use as active is stored in the boot-loader's environment 705. Two flags are maintained in the boot-loader environment: a 'kernel-boot-success' flag and a 'cream-boot-success' flag. When attempting to boot a partition, the boot loader first clears both flags. When the Linux kernel is loaded and begins executing, the kernel-boot-success flag is set. When the CREAM process begins executing the cream-boot-success flag is set. Before attempting to boot a partition, the boot loader checks the status of each flag. If the cream-boot-success flag is clear, the boot loader will make the standby partition active and attempt to boot it. After three sequential boot failures, the boot-loader will disable the hardware watchdog and boot a partition for which kernel-boot-success was set. If neither partition contains a bootable kernel then the boot-loader drops to its command prompt and waits for operator intervention.

Figure 8:
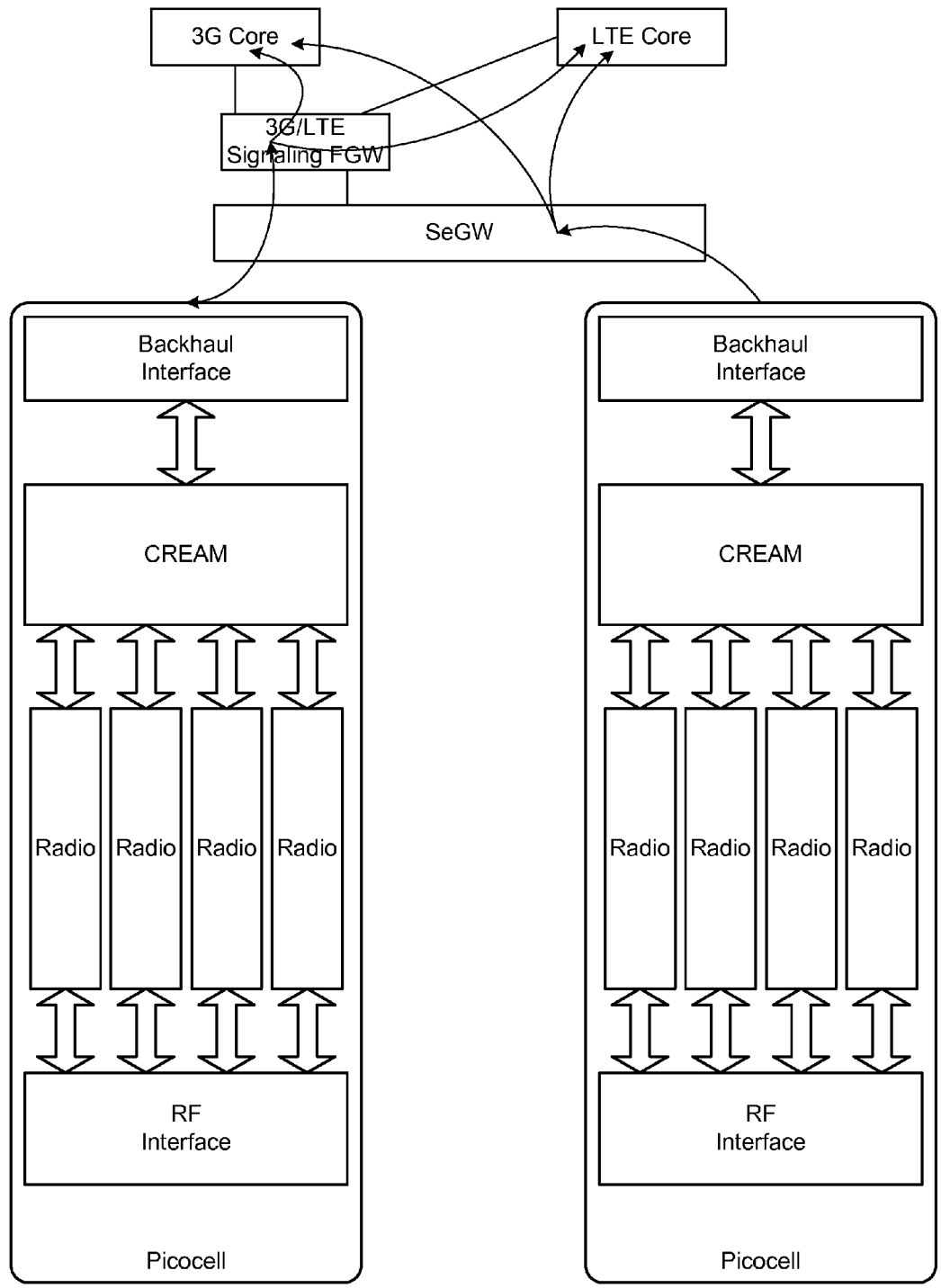
FIG. 8 is a diagram of an exemplary multi-RAN picocell network in accordance with aspects of the invention.

FIG. 8 is a block diagram of an exemplary multi-RAN picocell network. The exemplary network illustrated in FIG. 8 includes two picocells interfacing with the core networks of two RANs having different interface standards. The picocells illustrated in FIG. 8 may be implemented as the picocell illustrated in FIG. 2. The disclose picocells allow such network because they allow the co-location of multiple radio access networks having different interface standards within a single multi-PHY picocell environment.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Acronyms and Abbreviations

For convenience, the table below lists definitions for many acronyms and abbreviations used in this application.

| Term/Acronym | Definition |
| --- | --- |
| ACS | Automatic Configuration System |
| API | Advanced Programming Interface |
| BSS | Base Station System |
| CCPU | Continuous Computing |
| CDMA | Code Division Multiple Access |
| CNM | Core Network Management |
| eNB | Evolved Node B |
| ECGI | Enhanced Cell Global Identity |
| EPC | Evolved Packet Core |
| ERDSS | External Radio Device Support System |
| FAPI | Femto Application Platform Interface |
| GUI | Graphical User Interface |
| HOM | Handover Margin |
| IPM | Inter Pico cell Management |
| IDE | Integrated Development Environment |
| LTE | Long Term Evolution |
| MME | Mobility Management Entity |
| MP | Mobility Processor |
| NeNB | Newport Evolved Node B (CREAM-enabled picocell) |
| NMM | Network Monitor Mode |
| OAM | Operations, Administration, and Maintenance |
| OAM-GUI | Operations, Administration, and Maintenance Graphical UI |
| OAM-TR069 | Operations, Administration, and Maintenance Processing |

-continued

| Term/Acronym | Definition |
| --- | --- |
| OAM-TUI | Operations, Administration, and Maintenance Textual UI |
| PCI | Physical Cell Identity |
| PRACH | Physical Random Access Channel |
| PRB | Physical Resource Block |
| PWI | Public Wireless Incorporated |
| QoS | Quality of Service |
| RAB | Radio Access Bearer |
| RACH | Random Access Channel |
| RAT | Radio Access Technology |
| RF | Radio Frequency |
| RRC | Radio Resource Control |
| S-GW | Servicing Gateway |
| SCM | Source Code Management |
| SDD | Software Design Description |
| SDP | Software Development Plan |
| SGSN | Serving GPRS Support Node |
| SON | Self-Organizing Network |
| SRS | Software Requirements Specification |
| S1AP | S1 Application |
| TAI | Tracking Area Identity |
| TUI | Terminal User Interface |
| TTT | Time-To-Trigger |
| UE | User Equipment |
| UML | Unified Modeling Language |
| UMTS | Universal Mobile Telecommunications Service |
| X2AP | X2 Application |

What is claimed is:

1. A base station, comprising:
a plurality of radio devices, each of the radio devices operable to establish wireless communications with user equipments;
a backhaul interface module configured to send data to a core network and receive data from the core network;
a radio frequency interface module coupled to the plurality of radio devices and to one or more antennas, the radio frequency interface module being configured to process signals from the plurality of radio devices for radio transmission by the antennas and to process signals received from the antennas and supply the processed received signals to the plurality of radio devices, the radio frequency interface module comprising a power amplifier having a bias setting;
a processor; and
a memory coupled to the processor and storing instructions for execution by the processor, the instructions comprising:
a core network manager module operable to manage communications with the core network via the backhaul interface module;
a radio resource manager module operable to perform handover and call admission decisions for communications with the user equipments; and
a self-organizing network module operable to auto-configure operations of the base station for operation in a self-organizing network and to perform predictive algorithms for use in configuring operation of the radio devices.

2. The base station of claim 1, wherein configuring operation of the radio devices includes changing communication protocols of the radio devices.

3. The base station of claim 1, wherein the instructions further comprise an inter-picocell manager module operable to coordinate operation of the base station with other base stations.

4. The base station of claim 1, wherein the instructions further comprise a mobility processor module operable to control handover of communications with user equipments.

5. The base station of claim 4, wherein handover decisions include load balancing over multiple protocols used by the radio devices.

6. The base station of claim 4, wherein the mobility processor module is further operable to control transfer of communications with one of the user equipments from a first one of the radio devices to a second one of the radio devices.

7. The base station of claim 6, the first one of the radio devices and the second one of the radio devices communicate with the one of the user equipments using different frequencies.

8. The base station of claim 6, the first one of the radio devices and the second one of the radio devices communicate with the one of the user equipments using different protocols.

9. The base station of claim 1, wherein the instructions further comprise an operation, administration, and maintenance module operable to manage configuration and status requests between the base station and external systems.

10. The base station of claim 1, wherein the plurality of radio devices are operable to establish wireless communications with the user equipments using any of a plurality of communication protocols.

11. The base station of claim 10, wherein the plurality of radio devices are operable to establish wireless communications with the user equipments using any of a plurality of frequencies.

12. The base station of claim 10, wherein the backhaul interface module is operable to send data to the core network and receive data from the core network using any of a plurality of backhaul connections types.

13. The base station of claim 1, wherein the predictive algorithms include using information about locations of the user equipments, wherein the information about locations of the user equipments includes information from the wireless communications with the user equipments.

14. The base station of claim 1, wherein the radio frequency interface module is further configured to process the signals from the plurality of radio devices for radio transmission utilizing crest-factor reduction.

15. The base station of claim 14, wherein the instructions further comprise instructions jointly control the bias setting and the crest-factor reduction processing based on a plurality of communication protocols used by the radio devices.

* * * * *